(12) United States Patent
Seo (10) Patent No.: US 11,199,996 B2
(45) Date of Patent: *Dec. 14, 2021

(54) METHOD OF SCHEDULING REQUESTS TO BANKS IN A FLASH CONTROLLER

(71) Applicant: Kioxia Corporation, Tokyo (JP)

(72) Inventor: Kang Seok Seo, Cupertino, CA (US)

(73) Assignee: KIOXIA CORPORATION, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 16/724,966

(22) Filed: Dec. 23, 2019

(65) Prior Publication Data

US 2020/0125297 A1 Apr. 23, 2020

Related U.S. Application Data

(63) Continuation of application No. 15/434,916, filed on Feb. 16, 2017, now Pat. No. 10,540,116.

(51) Int. Cl.
G06F 3/06 (2006.01)

(52) U.S. Cl.
CPC ............ G06F 3/0659 (2013.01); G06F 3/061 (2013.01); G06F 3/0688 (2013.01)

(58) Field of Classification Search
CPC ..... G06F 3/0611; G06F 3/0659; G06F 3/0688
See application file for complete search history.

(56) References Cited

U.S. PATENT DOCUMENTS 6,745,277 B1 6/2004 Lee et al.
7,480,754 B2 1/2009 Priborsky et al.
8,510,496 B1 8/2013 Totolos, Jr. et al.
8,819,687 B2 8/2014 Chung et al.
9,213,637 B1 12/2015 Karamcheti et al.
9,304,691 B2 4/2016 Ide et al.
9,430,411 B2 8/2016 Lin et al.
2010/0199025 A1 8/2010 Nanjou et al.
(Continued)

OTHER PUBLICATIONS

Myoungsoo Jung et al., "Physically Addressed Queueing (PAQ): Improving Parallelism in Solid State Disks," Department of Computer Science and Engineering, The Pennsylvania State University, ISCA '12 Proceedings of the 39th Annual International Symposium on Computer Architecture, pp. 404-415, Portland, Oregon—Jun. 9-13, 2012.

*Primary Examiner* — Charles Rones
*Assistant Examiner* — Han V Doan
(74) *Attorney, Agent, or Firm* — Allen & Overy LLP (57) ABSTRACT

A memory system includes a memory controller, a first memory bank having a first I/O bus, a second memory bank having a second I/O bus, and a channel connecting the first I/O bus and the second I/O bus to the memory controller. The channel is used to transmit data between the first memory bank and the memory controller and between the second memory bank and memory controller, and is also used to transmit a command from the memory controller to the first memory bank and the second memory bank. The memory controller includes a bank command scheduler implemented in a hardware logic block. The hardware logic block includes a plurality of direct inputs and is able to determine, based on the plurality of inputs, an order in which to output commands to the first memory bank and the second memory bank over the channel; output a first command to the first memory bank; and output a second command to the second memory bank over the channel.

20 Claims, 5 Drawing Sheets

(56) References Cited

U.S. PATENT DOCUMENTS

| | | |
|---|---|---|
| 2010/0241784 A1 | 9/2010 | Iyer et al. |
| 2011/0145410 A1 | 6/2011 | Caldwell et al. |
| 2013/0254454 A1 | 9/2013 | Ide et al. |
| 2013/0262761 A1 | 10/2013 | Oh |
| 2015/0347327 A1 | 12/2015 | Blaine et al. |
| 2016/0266974 A1 | 9/2016 | Ichishima et al. |
| 2016/0371014 A1 | 12/2016 | Roberts |

METHOD OF SCHEDULING REQUESTS TO BANKS IN A FLASH CONTROLLER

CROSS-REFERENCE TO RELATED APPLICATIONS

This application is a continuation of application Ser. No. 15/434,916, filed Feb. 16, 2017, the subject matter of which is hereby incorporated herein by reference in its entirety.

FIELD OF THE INVENTION

The present invention generally relates to systems and methods to schedule transmission of commands over a shared channel to banks of NAND devices in a memory system.

BACKGROUND OF THE INVENTION

A solid state device (SSD) includes a plurality of NAND devices organized into banks which process commands and operations. SSDs include a scheduler which determines an order in which commands, including read, write, and erase commands, should be sent to the banks such that overall progress is made on the commands in the queues. This includes ensuring that low-latency operations such as reads are not queued behind longer-latency operations such as erases, and ensuring that the order of requests from application block requests, meta-data requests, and garbage collection requests are appropriately handled. In some cases, the scheduler manages a power consumption of the device as a whole. Since each of reads, writes, and erases consume different power, the operation scheduler may control overall device power consumption by controlling how many of each operation is active at a time.

Traditionally, command scheduling systems are implemented with an individual scheduler assigned to each bank of devices. The scheduler determines the optimal arrangement of priority and normal priority commands to be transmitted to the bank of devices. The schedule of commands transmitted to the bank of devices allows the system to more efficiently transmit and execute commands.

Multiple banks of NAND devices can be driven in parallel to increase the command transfer efficiency. One parallel operating method is a technique for interleaving a series of commands to a plurality of banks of NAND devices connected to the same channel (known as "bank interleaving"). The process of bank interleaving increases the efficiency of the execution of commands on the SSD by optimizing the usage of the channel and allows the banks to process commands in parallel.

Bank interleaving maximizes the commands sent to the banks in a given amount of time. For a command is that includes a latency time (for example, a write command), the time that the system waits for the response from the bank would be unused without bank interleaving. This contributes to an inefficiency of the system.

In systems which make use of bank interleaving, a scheduler sends a first command including a sequence of instructions to a bank over a channel. The scheduler then determines an efficient use of the latency time associated with the sequence of instructions and sends additional commands to other banks over a common channel. An operation scheduler schedules read, write, and erase operations within banks of devices over a memory channel or memory channel bus. The operation scheduler may receive various inputs including the operations currently being executed and operations in the command or operations queue.

Bank interleaving is typically implemented using a software based logic system in which a command scheduler repeatedly iterates through a series of loops in order to determine an optimal schedule of commands. However, using software logic to determine a schedule of interleaved commands quickly becomes bulky and time delays are introduced when scaled up due to the number of inputs required to efficiently schedule the commands. For example, the determination of an optimal schedule of commands relies on knowledge of a large number of variables including information related to the status of each bank of devices, the command currently being executed by each bank, the time that each of the command will take to be completed, and a status of each of the queues of commands waiting to be transmitted to the banks. While a software-based loop of code can iterate through this information for a small number of banks to determine a next command to be transmitted, as the number of banks sharing a channel is increased the code becomes unwieldy and the processing time for each determination suffers. Accordingly, there is a long-felt need to correct the problems inherent to present day systems.

BRIEF DESCRIPTION OF THE INVENTION

In an aspect, a memory system includes a memory controller, a first memory bank having a first I/O bus, a second memory bank having a second I/O bus, and a channel connecting the first I/O bus and the second I/O bus to the memory controller. The channel is used to transmit data between the first memory bank and the memory controller and between the second memory bank and the memory controller. The channel is also used to transmit a command from the memory controller to the first memory bank and the second memory bank. The memory controller includes a bank command scheduler implemented in a hardware logic block, and the hardware logic block includes a plurality of direct inputs. The hardware logic block determines, based on the plurality of direct inputs, an order in which to output commands to the first memory bank and the second memory bank over the channel, outputs a first command to the first memory bank, and outputs a second command to the second memory bank over the channel.

In another aspect, a method of scheduling a distribution of commands to a first and a second memory bank includes using a hardware logic block to determine a first command to send to a first NAND bank over a channel and transmitting the first command to the first NAND bank over the channel. The method also includes using the hardware logic block to determine from a plurality of direct hardware inputs a waiting time for the first command to be executed by the first NAND bank, determining a second command to send to a second NAND bank over the channel during the waiting time for the first command to be executed, receiving a completion signal from the first NAND bank related to the first command, and prior to receiving the completion signal, transmitting the second command to the second NAND bank over the channel.

In another aspect, a method of determining a bank scheduling order for a NAND device having a plurality of banks with a shared channel includes setting an input register to a first priority rule, and setting an operation request to determine a first status of the plurality of banks of the NAND device and a plurality of command queues. The method further includes determining whether the first priority rule and the operation request is sufficient to select a bank to receive a command. If a bank can be selected to receive the command according to the first priority rule and the operation request, checking an operation status for the bank scheduled to receive the command and transmitting the command to the bank when the operation status is not busy. If a bank cannot be selected to receive the command according to the first priority rule and the operation request, the method includes setting the input register to a second priority rule for, setting an operation request to determine a second status of the plurality of banks of the NAND device and the plurality of command queues, determining that a next bank to be scheduled can be determined from the operation request and the second priority rule, and transmitting the command to the selected bank.

DETAILED DESCRIPTION OF THE INVENTION

Figure 1:
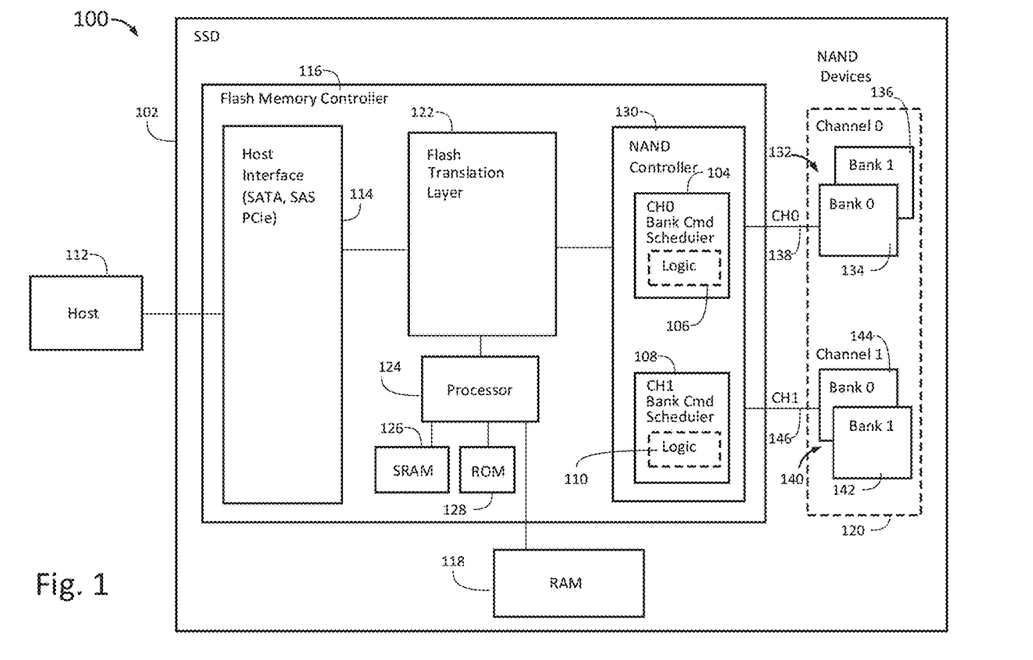
FIG. 1 shows a block diagram of an SSD including a bank scheduler with decision logic, according to an embodiment.

FIG. 1 shows a block diagram 100 that schematically illustrates the structure of a solid-state drive (SSD) 102, in accordance with an embodiment of the present invention. The SSD 102 couples to a host device 112.

The host device 112 (e.g., a personal computer) connects to the SSD 102 via a communication interface 114 conforming to a storage interface standard. The SSD 102 functions as an external mass storage device of the host device 112. Standards such as SATA (Serial Advanced Technology Attachment), SAS (Serial Attached SCSI), PCIe (Peripheral Components Interconnect Express) are examples of the communication interface standard between the SSD 102 and the host device 112.

The SSD 102 includes a flash memory controller 116, a random access memory (RAM) 118, and NAND memory devices 120. The flash memory controller 116 includes a communication interface 114, a flash translation layer (FTL) 122, a processor 124, a static random access memory (SRAM) 126, a read-only memory (ROM) 128, and a NAND controller 130. The NAND controller 130 includes a first bank scheduler 104 having first decision logic 106 and second bank scheduler 108 having second decision logic 110. The NAND devices 120 includes one or more devices, each device composed of multiple banks of die coupled to the NAND controller 130 by a channel. The NAND devices 120 of FIG. 1 include a first NAND device group 132 having a first bank (Bank1 0) 134 and a second bank (Bank1 1) 136 coupled to the first bank scheduler 104 by a first channel 138, and a second NAND device group 140 having a first bank (Bank2 0) 142 and second bank (Bank2 1) 144 of devices or dies, which are coupled the second bank scheduler 108 by second channel 146.

The NAND devices 120 are nonvolatile (non-transitory) NAND memory devices (e.g., first NAND device group 132 and second NAND device group 140) configured to store data read and written from and into the host device 112. The flash memory controller 116 performs (executes) data transfer control on the SSD 102. The RAM 118 temporarily stores data transferring between the host 112 and the NAND devices 120 by the flash memory controller 116. The RAM 118 functions as a data cache memory of the NAND devices 120, and may employ dynamic random access memory (DRAM), ferroelectric random access memory (FeRAM), magnetoresistive random access memory (MRAM), and the like.

The processor 124 in the flash memory controller 116 executes boot code in the ROM 128, transferring control to FTL firmware running in the SRAM 126 to manage the interchange of data between the host interface 114 and the NAND controller 130 via the RAM 118.

The flash memory controller 116 interfaces to the NAND devices 120 by one or more flash memory buses, called channels. For simplicity, FIG. 1 shows only two channels, the first channel (CH0) 138 and the second channel (CH1) 146, although there may be 8, 16, or more channels. On each channel, there may be multiple NAND memory devices (for example, first NAND device group 132 and second NAND device group 140) with multiple memory dies within each device. Dies or devices may be grouped together into units (i.e., banks) which are independently selectable using chip enable signals. For simplicity, FIG. 1 shows only two banks per channel, Bank 0 and Bank 1, although there may be 8, 16, or more banks per channel.

The NAND controller 130 includes a bank scheduler (104, 108) corresponding to each of the channels, first channel (CH0) 138 and second channel (CH1) 146. First bank scheduler 104 controls the scheduling of memory commands issued to first bank (Bank1 0) 134 and second bank (Bank1 1) 136 on first channel (CH0) 138. Second bank scheduler 108 controls the scheduling of memory commands issued to first bank (Bank2 0) 142 and second bank (Bank2 1) 144 on second channel (CH1) 146.

First logic block 106 and second logic block 110 provide bit operation and support logic for bank selection within the first bank scheduler 104 and the second bank scheduler 108, respectively, in the NAND controller 130. The first logic block 106 and the second logic block 110 are hardware implemented logic blocks including logic gates and direct hardware inputs indicating statuses of the devices in the first NAND device group 132 and second NAND device group 140 and the first channel (CH0) 138 and the second channel (CH1) 146. The logic blocks 106 and 110 enable the bank schedulers 104 and 108 to schedule commands being transmitted to the banks in the first NAND device group 132 and second NAND device group 140 in order to make efficient use of the first channel (CH0) 138 and the second channel (CH1) 146.

The first bank scheduler 104 and the second bank scheduler 108 use first logic block 106 and the second logic block 110, respectively, to determine an order in which commands from the host 112 are transmitted to the banks of the NAND devices 120 over the first channel (CH0) 138 and the second channel (CH1) 146. Hardware-implemented logic blocks are better able to quickly determine an appropriate next bank for command transmission over a shared channel, because they are able to efficiently handle a multitude of variables and conditions, increasing the efficiency of command processing and scheduling.

A command cycle consists of a sequence of periods or zones. The first period is an address and command setup, followed by a data transfer in cases of a write command. This is followed by an inactive period in which the command is internally processing in the bank. The final period is a status or response from the bank. Of these periods, the inactive period is the only period where there is no bus data transfer activity. Bank interleaving allows commands to be sent to other banks over the same channel during this period of inactivity.

Because some commands, for example a write command, includes a high-latency inactive period, a write command can be sent over the first channel CH(0) 138 to first bank (Bank1 0) 134, and additional commands can be sent over the channel to other banks while the first bank (Bank1 0) executes the command. Interleaving the commands transmitted over the channel in this way enables the SSD 102 to process commands more efficiently because multiple banks can be independently executing commands simultaneously while sharing a single channel. Though only one command can be transmitted over the channel at a time, additional commands can be sent to other banks in sequence while a first bank is busy executing a command as long as the bus data transfer zones of the commands cycles do not overlap.

For a write command transmitted to the first bank (Bank1 0), data to be written is presented from the NAND controller 130 to the first bank (Bank1 0) 134 over the first channel (CH0) 138, and the first bank (Bank1 0) 134 begins to write the data. While the data is being written, the first bank (Bank1 0) 134 is busy, but the first channel (CH0) 138 may not be busy. More particularly, writing data may take up to 2 ms to complete, during which the first channel (CH0) 138 is not busy. The first logic block 106 determines the amount of latency time for the first bank (Bank1 0) 134 during the data writing execution and determines if an additional command can be sent to another bank over the first channel (CH0) 138 during this time, thereby increasing efficiency by minimizing the time that the first channel (CH0) 138 is idle.

The second bank scheduler 108 functions similarly. The second bank scheduler 108 uses the second logic block 110 to determine an order in which commands from the host 112 are transmitted to the banks of the NAND devices 120 over the second channel (CH1) 146. In the same way that the first bank scheduler 106 schedules commands over the first channel (CH0) 138 to maximize the efficiency of the command execution, the second bank scheduler 108 schedules the commands to the NAND devices 120 in the second NAND device group 140 over the second channel (CH1) 146. Multiple bank schedulers operating in tandem in a single SSD 102 allow the NAND devices 120 in the SSD 102 to efficiently process commands from the host 112 in parallel.

For example, while the data is being written by the first bank (Bank1 0) 134, the first logic block 106 determines that there are 2 ms in which the first bank (Bank1 0) 134 cannot accept additional commands, but other banks in the first NAND device group 132 may accept commands over the first channel (CH0) 138. The first logic block 106 may set a timer to indicate that there are 2 ms remaining in the latency period for the first bank (Bank1 0). The first logic block 106 includes logic that consults a queue of commands for additional banks in the first NAND device group 132 and selects a bank to which a subsequent command should be transmitted over the first channel (CH0) 138 while the first bank (Bank1 0) 134 is writing data. The subsequent command to be transmitted may be selected by the bank scheduler 104 based on a plurality of hardware signals related to the status of the queues and the status of the banks. The subsequent command may be a read command to be transmitted to the second bank (Bank1 1) 136. The first bank scheduler 104 then transmits the read command to the second bank (Bank1 1) 136 over the first channel (CH0) 138. The read command is executed by the second bank (Bank1 1) 136 and a completion signal may be transmitted back over the first channel (CH0) 138. A completion signal for the write command being executed by the first bank (Bank1 0) 134 may then be received over the first channel (CH0) 138, or additional commands may be transmitted to the second bank (Bank1 1) 136 based on the determinations of the first logic block 106.

Figure 2:
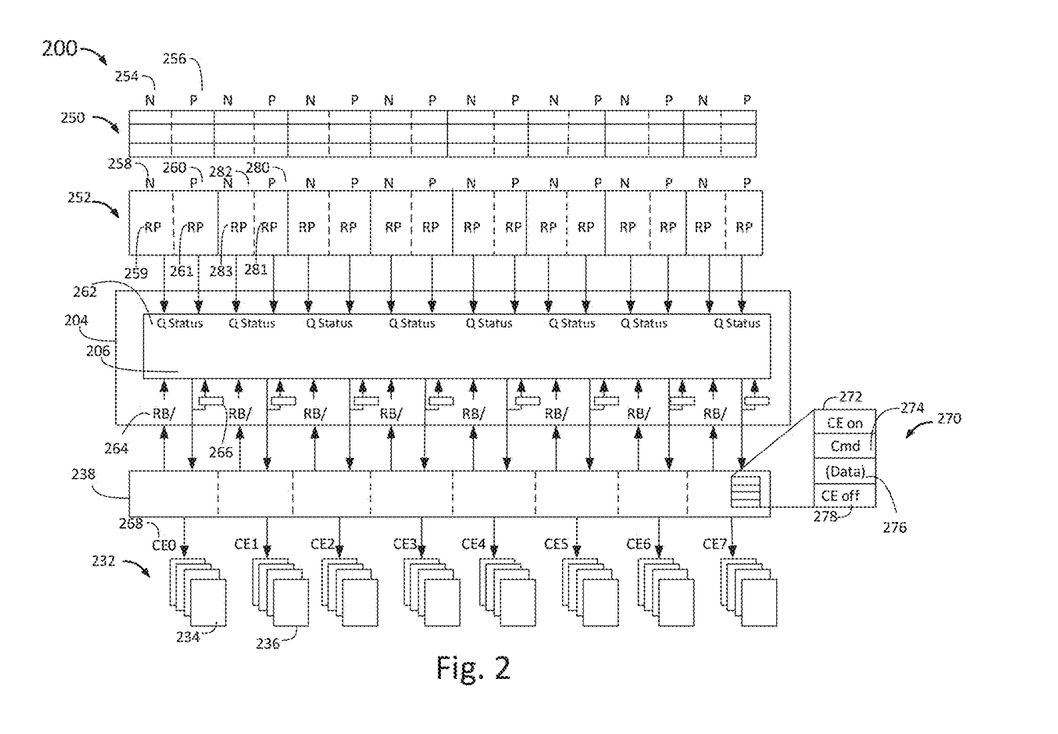
FIG. 2 shows a block diagram of a single channel's bank scheduler with decision logic, according to an embodiment.

FIG. 2 shows a block diagram 200 of a single channel's bank scheduler 204 (e.g., corresponding to bank scheduler 104 or 108 described above) with decision logic, according to an embodiment. The block diagram 200 includes the bank scheduler 204 having a logic block 206. The bank scheduler 204 is coupled to the NAND devices 232 by a shared NAND bus channel interface 238. The block diagram 200 also includes a bank queue 250 divided into normal priority queues (e.g., normal queue 254 denoted by "N") and priority queues (e.g., priority queue 256 denoted by "P") for each of the banks of NAND devices 232. A head of each queue 252 including a head of the normal queue 258 and a head of the priority queue 260 are presented to the bank scheduler 204 into a logic block 206 as a status of the queue 262. Also presented to the logic block 206 is a ready/busy signal 264 for each bank in the NAND devices 232 and a timer 266 which indicates a time remaining in execution of a command transmitted to a bank in the NAND devices 232.

The bank scheduler 204 including the logic block 206 accepts various inputs into the support logic instantiated in hardware, including the ready/busy signal 264, timer 266, and status of the queue 262. The bank queue 250 includes a plurality of command queues for the banks of the NAND devices 232 serviced by the bank scheduler 204. Each bank has an associated normal queue 254 and priority queue 256 which function as a list of commands from the host sorted into normal and priority commands. For example, in FIG. 2, eight banks of devices or flash memory dies are shown, including a first bank 234 and a second bank 236, and accordingly, 16 bank queues 250 are shown including eight normal priority queues (e.g., normal priority queue 254) and eight priority queues (e.g., priority queue 256). Whether a command is a normal command that should be entered in the normal priority queue 254 or a priority command to be entered into the priority queue 256 may be instructed by the host or may be based on the type of command. Each queue contains a list of commands to be transmitted to the associated bank of dies in the NAND devices 232 over the common NAND bus channel interface 238. The first command in each queue is in the head of the queue 252 where it is shown as a request packet (RP). The head of the normal priority queue 258 contains normal priority command 259. The head of priority queue 260 contains priority command 261. The request packet may be any appropriate NAND operation command, including read, write, erase, or other commands to be transmitted to one of the banks. In some implementations, the logic block 206 accepts additional inputs such as a current power usage of the NAND devices.

The first command in each queue in the head of the queue 252 is available to the logic block 206 in the bank scheduler 204 as the status of the queue 262. The input of the commands in the head of each queue 252 is received by the logic block 206 as the status of the queue 262 and enables the logic block 206 to determine to which bank a next command should be scheduled over the NAND bus channel interface 238 in which order. The logic block 206 includes logic which gives preference to commands which are queued in the priority queues (e.g., head of priority queue 260). In some implementations, the logic block 206 includes logic that preferences all commands queued in the priority queues (e.g., priority command 261) before transmitting any normal priority commands (e.g., normal priority command 259). In such a situation, normal priority commands (e.g., normal priority command 259) are sent only when there are no commands queued in the priority queues. In some implementations, normal priority commands (e.g., normal priority command 259) and priority commands (e.g., priority command 261) are transmitted over the NAND bus channel interface 238 in a mixed order dependent on other inputs to the logic block 206.

In some implementations, the logic block 206 includes logic that suspends the processing of normal priority command (e.g., normal priority command 259) on a bank in order to transmit and execute a priority command (e.g., priority command 261) that has been queued in a priority queue (e.g., priority queue 256 and head of priority queue 260) for the same bank after the normal priority command has been transmitted. For example, if the normal priority command 259 is an "Erase" command, and there is no priority command 261 in the head of the priority queue 260, the logic block 206 will transmit the "Erase" command to the first bank 234 over the common NAND bus channel interface 238. The logic block 206 sets the timer 266 for a predetermined time period, which may correspond to a period of time typically needed for execution of the "Erase" command. While the logic block 206 continues to schedule commands to other banks, a priority command 261 such as a read request may be placed in the head of the priority queue 260 for the first bank 234. If the timer 266 associated with the "Erase" command executing on the first bank 234 has not yet expired, the logic block 206, can issue a "Suspend Erase" command to the first bank 234 for pausing execution of the "Erase" command. After the "Suspend Erase" command has been received and/or confirmed by the first bank 234, the logic block 206 then issues the priority "Read" command to the first bank 234. The "Read" command is then executed by the first bank 234. After the "Read" command has been executed, if there are no additional priority commands 261 in the priority queue 256, the logic block 206 or bank scheduler 204 may instruct the first bank 234 to "Resume" the suspended erase operation.

A command that has been determined by the bank scheduler 204 to be transmitted next is transmitted over the NAND bus channel interface 238 to the appropriate bank of devices or flash memory dies 232 as determined by the logic block 206. The command is transmitted with a flash bank command sequence 270. The flash bank command sequence 272 includes a first phase "CE on" 272 in which the chip enable for the selected bank of devices or flash memory dies 232 is transmitted to the selected device. The flash bank command sequence 272 also includes a second phase "Cmd" 274 in which the command code and memory address for the particular command is given. For example, the command may be a read request, a write request, an erase request, or any other suitable request. After sending the command to the selected device, the logic block 206 sets the timer 266 to a predetermined time period based on the command type (e.g., a read, write, erase, etc.), the predetermined time period corresponding with a period of time associated with the typical execution of the transmitted command type. Depending on the command transmitted, the flash bank command sequence 270 may include a third phase "Data" 276 in which data is presented over the NAND bus channel interface 238 to the selected device (for a write command) or by the selected device (for a read command). For certain command types, an inactive phase (not shown) in which no information is transmitted by the selected device over the channel occurs before or after the "Data" 276 phase. For example, for a write command an inactive phase occurs after the "Data" 276 phase, and for a read command an inactive phase occurs before the "Data" 276 phase. Erase operations might not have the third phase "Data" 276. The selected device within the bank of devices then executes the command. When the timer 266 has expired for the execution of the transmitted command, the logic device 206 requests a status from the selected device on the first bank 234, and the selected device transmits a signal or suitable response to the logic block 206 for the particular command transmitted. Alternatively, the logic block 206 may determine the status of the operation from the ready/busy signal 264 of the selected device. By requesting the status from the selected device, the logic block 206 transmits a request for the status only when there is an appropriate amount of time in the schedule of commands to both request and receive the status. In some embodiments, the method by which the logic block 206 determines a status of the operation may be selectively configured in the supporting hardware. After the command has been completed and the status of the operation has been transmitted to the logic block 206, the flash bank command sequence 270 then includes a fourth phase "CE off" 278 in which the chip enable for the particular device is turned off.

When a command is transmitted to one of the bank of devices 232 (e.g., to first bank 234) via the NAND bus channel interface 238, the logic block 206 determines whether a subsequent command should be transmitted and also determines to which of the banks the subsequent command should be transmitted to. The logic block 206 continuously has access to the updated inputs from the ready/busy signal 264, timer 266, and status of the queue 262 for each bank. A series of logic gates allows the logic block 206 to determine the schedule of the commands in order to efficiently distribute and execute the commands to each of the banks. The logic gates also allow the logic block 206 to maintain a consistency of execution of the scheduled commands.

The logic block 206 determines the order in which banks will receive a command via the NAND bus channel interface 238. The bank scheduler 204 determines the order in which the commands in a queue associated with a particular bank will be transmitted to the associated bank. For example, the logic block 206 may determine that the first bank 234 is not currently busy and is the next bank to which a command should be transmitted. The bank scheduler 204 then determines which command will be transmitted to the first bank 234, based on the commands at the head of the priority queue 260 and the head of the normal priority queue 258. Each bank has its own pair of priority queue 256 and normal priority queue 254 from which the logic block 206 determines an order of commands. As an example, if the priority command 261 at the head of the priority queue 260 for the first bank 234 is a write command, and a normal priority command 259 at the head of the normal priority queue 254 for the first bank 234 is a read command, the logic block 206 of the bank scheduler 204 gives preference to the priority command 261 and the bank scheduler 204 transmits the priority write command 261 to the first bank 234 over the NAND bus channel interface 238 by transmitting the first command "CE on" 272 and the second command "Cmd" 274 to the first bank 234. In this case, the second command "Cmd" 274 is a command to execute a write program. The bank scheduler 204 then transmits the third command "(Data)" 276 (which includes the actual data to be written)

over the NAND bus channel interface 238 to the first bank 234. While the first bank 234 is executing the write command, the ready/busy signal 264 of the first bank 234 will signal that the first bank 234 is busy. In some embodiments, the ready/busy signal 264 is high when the first bank 234 is ready to receive a command and low when the first bank 234 is busy executing a command. The timer 266 corresponding to the first bank 234 will also be set to show that the first bank 234 is busy executing a command and the expected duration before the command is completed. In some embodiments, the time on the timer may represent an estimate on the time needed to complete a command, and may be based on the type of command being executed. Alternatively, the timer may represent an average time that it takes for the type of command to be executed, and/or may be updated based on the particular command and amount and/or type of data to be written or read.

While the first bank 234 writes the data, the logic block 206 uses the inputs including the ready/busy signal 264, timer 266, and status of the queue 262 for the first bank 234 and all other banks to determine if additional commands can be transmitted over the channel before the first bank 234 completes the data writing, effectively interleaving commands to make efficient use of the channel. The logic block 206 selects the next bank for which a command should be transmitted and schedules the next appropriate command to the selected bank in the device based on which banks are busy and the status of each of the queues.

The inputs to the logic block 206 may indicate that there is a normal priority read command 283 at the head of the normal priority queue 282 for the second bank 236. The logic block 206 also has the information from the various ready/busy signals 264 and timers 266, and may determine that the first bank 234 is busy and will be busy executing the read request for the next 2 ms, but the second bank 236 is not currently busy. If there are no priority commands in the priority queue for the second bank 236, the logic block 206 determines that the normal priority read command 283 should be transmitted to the second bank 236 over the NAND bus channel interface 238 while the first bank 234 continues to write the data. If there is a priority command 281 in the head of the priority queue 280, the logic block 206 will instead give preference to the priority command 281 and transmit the priority command 281 to the second bank 236.

The scheduling of priority commands scheduled for different banks is handled by the logic block 206 based on the input supporting logic that may indicate an order that banks should be scheduled in. In some implementations, the logic block 206 may include logic that determines an estimated time that the priority commands at the head of priority queues associated with each bank will take to transmit and/or execute and determine if the command can be transmitted during the waiting period during which the first bank 234 is writing the data. The logic block 206 is continually requesting and receiving updated inputs from the NAND device banks 232 and from the heads of the queues 252, and making determinations based on these inputs. Additional inputs to the logic block 206 may also influence how the logic block 206 makes determinations in certain situations, for example whether all priority commands are dealt with first or if normal priority commands are transmitted if they are the only command that fits in a given schedule.

The first bank 234 therefore has a status which changes as it receives a command, is busy executing a command, and has completed a command. For example, once the command has been executed, the status indicates that the first bank 234 is ready for a next command. The status of the first bank 234 is apparent to the logic block 206 via the ready/busy signal 264 and the timer 266. The logic block 206 transmits a command to the first bank 234, sets the timer 266 for the command and waits and/or checks the timer 266 until the timer 266 is expired, checks whether the first bank 234 has a ready/busy signal 234 that indicates that it is ready to receive a command, and if not, the logic block 206 repeats the check. Meanwhile, the logic block 206 also checks the ready/busy signal 264 and timer 266 of the other banks, determines the order in which banks should be scheduled, and transmits commands to these banks if ready and if the command can be scheduled with the currently executing commands.

FIG. 2 shows 16 bank queues 250 corresponding to 8 banks of devices 232 and bank having its own chip enable (e.g., CE0 268). Each of the 8 banks is composed of an array of dies (shown as four dies) which have a single chip enable. This is an example of a four-way interleaving configuration in which four logical unit number (LUN) NAND dies are grouped into a bank and have only one chip enable. Such a configuration allows a smaller number of chip enables to be used on a single channel to access a large number of individual dies. In some implementations, the bank queues 250, chip enables, and banks of devices 232 may be interleaved in other ways.

Figure 3:
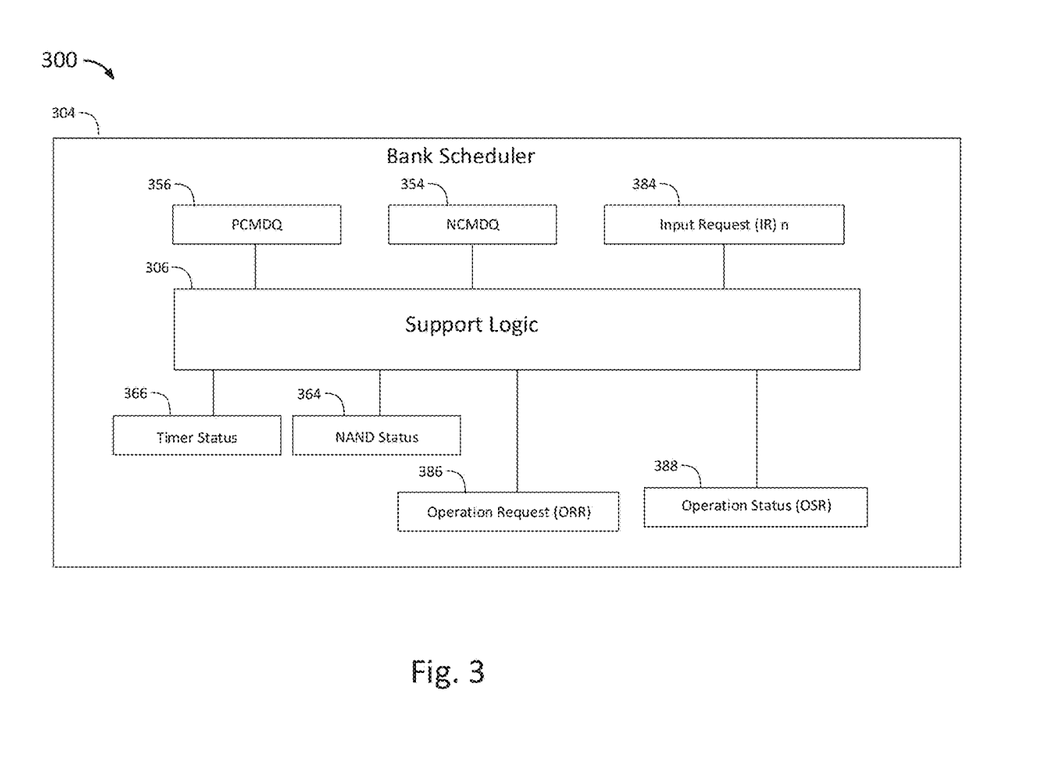
FIG. 3 shows a block diagram of the inputs to the bank scheduler, according to an embodiment.

FIG. 3 shows a block diagram 300 that illustrates the direct inputs to the bank scheduler 304, according to an embodiment. The bank scheduler 304 includes the logic block 306, which comprises hardware-based support logic. The support logic uses various direct inputs to determine an optimal schedule of commands to a plurality of devices over a single channel. The inputs to the logic block 306 are illustrated in block diagram 300 and include a priority command queue (PCMDQ) 356, a normal command queue (NCMDQ) 354, a timer status 366, a NAND status 364 (which may be a ready/busy signal for a bank), an operation request (ORR) 386 (which includes the currently executing command on a particular bank), and an operation status 388 which specifies the inputs to the logic block 306 and the operation logic to be used in scheduling the commands.

The logic block 306 also includes an external input which is an input request (IR)(n) 384 that can be used to externally control how the logic block 306 will determine a schedule of commands in particular situations. For example, the input request (IR)(n) 384 can be changed externally to enable the logic block 306 to suspend normal priority commands in order to transmit priority commands. If needed, additional input request (IR)(n) 384 can be input into the logic device 306. The input request (IR)(n) may include multiple rules (n rules) in an input register (IR) which are applied by the logic block 306 according to a particular order to quickly select a command to transmit. The operation status (OSR) 388 sets the level of operation specifying the inputs from the priority command queue 356, a normal command queue 354, a timer status 366, a NAND status 364, and the input request (IR)(n) 384 to be used. The bank scheduler 304 has an n-level of decision priority based on the number (n) of input request (IR)(n) 384 rules, which are meant to allow the logic block 306 to quickly determine a selected command to schedule from many combinations of commands and banks. Once the operation status (OSR) 388 has set the inputs, the logic block 306 attempts to determine a bank for which a command operation should be scheduled according to a first input request (IR)(n) 384 rule. If a bank cannot be determined based on the first input request (IR)(n) 384 rule, a second input request (IR)(n) 384 rule can be applied and the logic block 306 can again attempt to determine a bank based on the second input request (IR)(n) 384 rule. In this way, the command scheduling process can be continued throughout all possible cases. The logic block 306 may accept additional inputs such as a current power usage of the NAND devices or SSD. When a set of inputs and input request (IR)(n) to the logic block 306 result in a "hit" (i.e., successfully identify a bank for which a command should be scheduled next), the logic block 306 stops and the operation status (OSR) 388 reports the result. If there is no "hit" after cycling through the inputs and input request (IR)(n), the operation status (OSR) 388 reports no hit.

After a bank for which a command operation should be determined is selected by this process, the logic block 306 reports the bank for which a next command should be scheduled. The bank scheduler 304 then uses supporting logic and rules to determine the command that should be executed on the selected bank and transmit the command to the appropriate bank.

Figure 4:
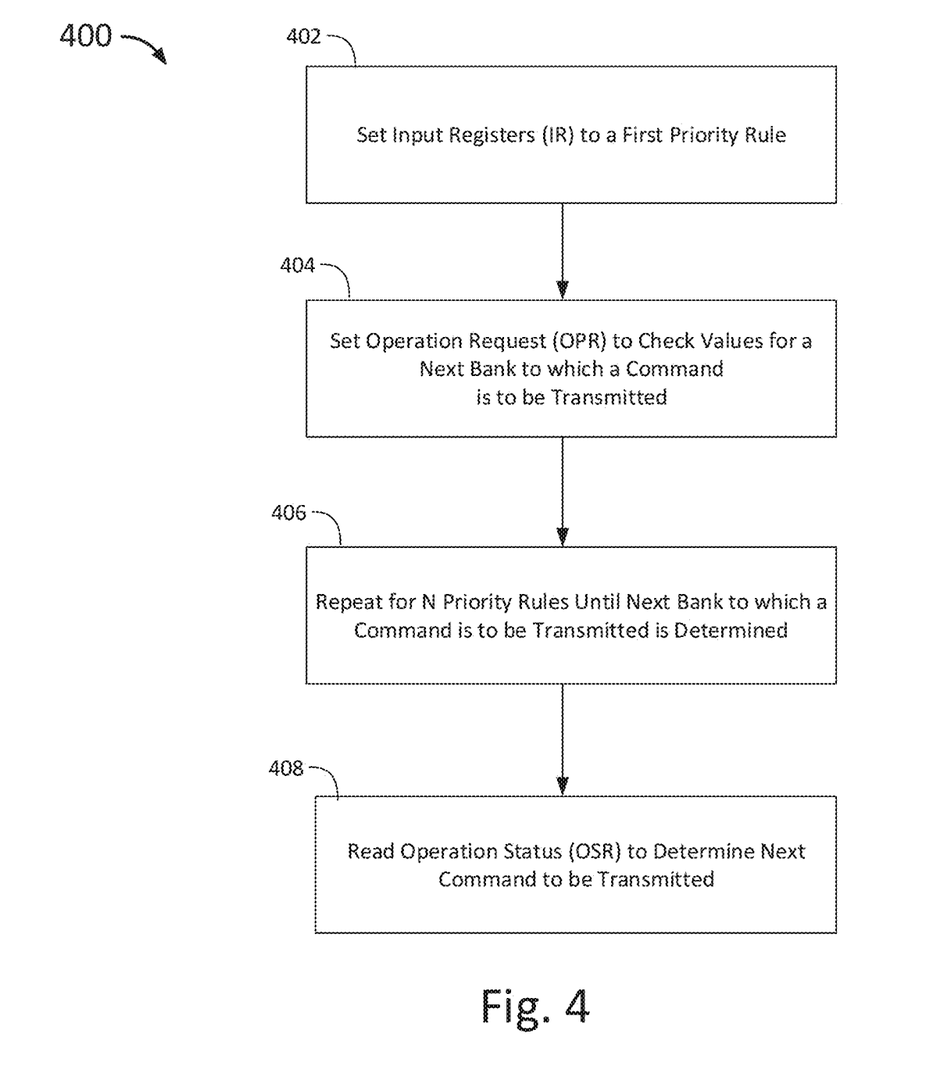
FIG. 4 shows a flow chart of a process for scheduling queue items using a bank scheduler with hardware support logic, according to an embodiment.

FIG. 4 shows a flow chart 400 that illustrates a process for scheduling queue items using a bank scheduler with hardware support logic, according to an embodiment. At step 402, the input registers are set for processing. The input registers include a list of input request rules which the logic block uses to determine a next bank to which a command from the queues should be scheduled. The input register may include a prioritized order of input request rules, which determines the order for applying the rules. Setting the input registers for processing includes selecting the first priority rule which the logic block should first attempt to apply to determine the command from the queues that should be scheduled to be transmitted next over the channel. At this step, the logic block also receives other internal direct inputs that allow the logic block to determine the selected bank. For example, internal direct inputs may include the queue status for priority and normal queues for each bank, a status of each bank in a ready/busy signal and a timer for any commands currently being executed on a bank. Based on these inputs and the first priority rule of the input register, the logic block attempts to determine to which bank the next command should be scheduled.

At step 404, the operation request (OPR) is set to process a selected operation. The operation request is an external input to the logic block. The operations request allows the logic block to attempt to determine a next appropriate bank according to the current rule of the input register. Also at step 404, the following are set: (1) the inputs from the queue status for priority and normal queues for each bank, (2) a status of each bank in a ready/busy signal, (3) a timer for any commands currently being executed on a bank, and (4) the rule to be applied by the supporting logic.

At step 406, the process of step 404 is repeated for n levels of priority selection. At this step, if the attempt by the logic block at step 404 to determine a next appropriate bank was unsuccessful, the rule indicated by the input register is changed and the logic block makes another attempt to determine a next appropriate bank. This is repeated for n rules of the input register until the logic block is successful in identifying a bank to which a command should next be scheduled.

At step 408, the logic block outputs a decision to the operation status (OSR) based on the received direct inputs and the determination from steps 404 and 406 and proceeds to read the operation status to determine which bank should have a next command scheduled. The operation status (OSR) may report a "hit" if applying the combination of inputs and rule results in a determined bank to be scheduled next. If the combination yields no result, the operation status (OSR) reports "no hit". After the operation status (OSR) reports a bank to be scheduled next, the bank scheduler determines based on a supporting logic and rules which command from the command queues for the chosen bank should be transmitted to the bank next, and transmits the chosen command to the chosen bank.

Figure 5:
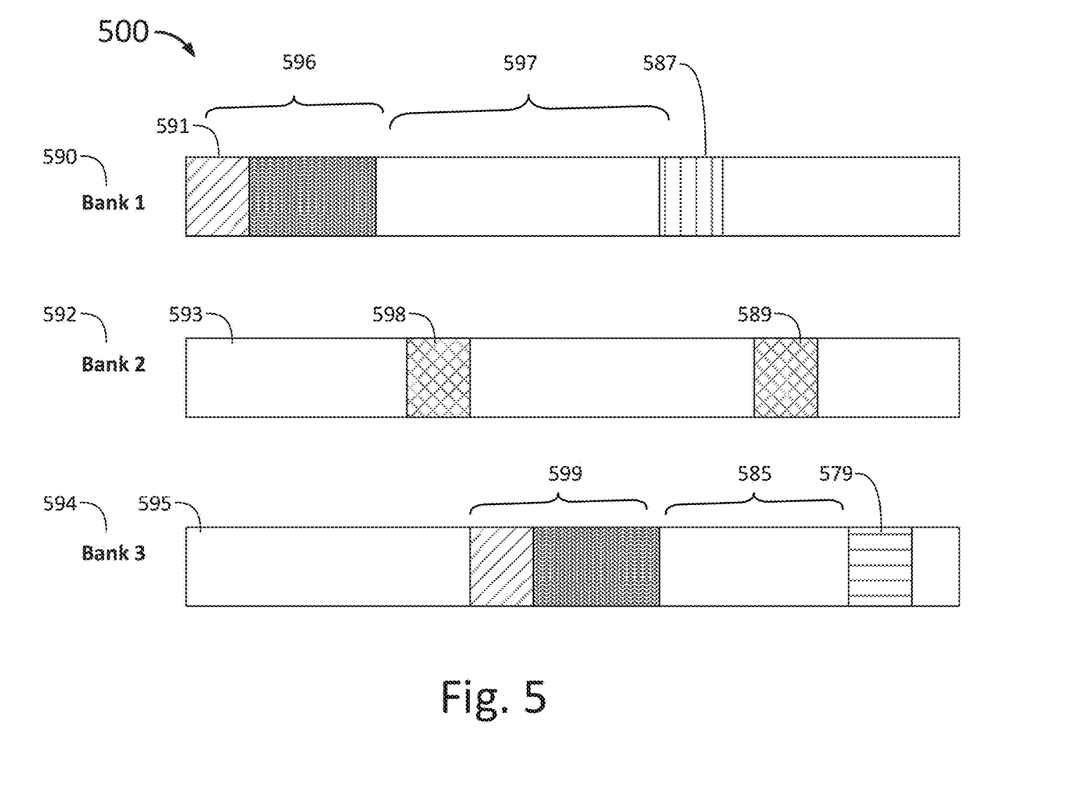
FIG. 5 shows a timing chart illustrating the scheduling of commands to multiple banks over a shared channel.

FIG. 5 shows a timing chart 500 illustrating an operation time of each bank according to an embodiment. The timing chart 500 includes a list of three banks, each with its own timing track, a first bank (Bank 1) 590 with first timing track 591, a second bank (Bank 2) 592 with second timing track 593, and a third bank (Bank 3) 594 with third timing track 595. The first bank 590, second bank 592, and third bank 594 share a common channel over which data and commands may be transmitted. However, each bank has its own associated chip enable. Each of the three banks can operate independently in parallel, but data can only be transmitted to one bank at a time over the common channel. The shaded periods in each of the timing tracks represents the transmission of data over the channel to the respective bank. As shown, shaded periods do not overlap, as only one command or response signal can be transmitted over the channel at a time.

The timing chart 500 shows an example outcome in which a logic block operating on a bank scheduler is determining an optimal interleaving of commands over the channel. In the example, a first write command 596 is transmitted over the channel to the first bank 590. The first write command 596 includes a chip enable signal, a write command and the data to be written. The first write command 596 is transmitted from the command scheduler to the first bank 590 over the channel. After the first write command 596 is transmitted and the data is presented, there is a period 597 in which the first bank 590 is busy executing the write command. No further commands can be sent to the first bank 590 at this time. However, the channel can still be used by the command scheduler to transmit additional commands to other banks.

In the example illustrated in FIG. 5, the hardware logic block determines, based on inputs from the banks and from the command queues, that there is sufficient time left in the period 597 that additional commands can be sent over the same channel without overlapping transmissions. The logic block determines based on hardware input and internal logic that the second bank 592 should be scheduled next. The command scheduler determines that the next command to be sent to the second bank 592 is a first read command 598. The first read command 598 is transmitted over the same channel to the second bank 592, and the second bank 592 executes the first read command 598.

The hardware logic block then determines, based on inputs from the banks and from the command queues, that there is still sufficient time left in the period 597 during which the first bank 590 is still executing the first write command 596, that a third command can be sent over the channel without overlapping with other commands. The logic block determines that the third bank 594 should be scheduled next. The command scheduler determines that the next command to be transmitted to the third bank 594 is a second write command 599. The second write command 599 is then transmitted over the channel to the third bank 594 including a chip enable signal, a write data command and the data to be written. After the data has been presented to the third bank 594, the third bank proceeds to execute the second write command 599 by writing the data. During this period 585, the third bank 594 is busy writing the data and no further commands can be transmitted to the third bank 594. However, additional commands can be sent over the channel to other banks.

During the period 585 in which the third bank 594 is busy writing the data, a first completion signal 587 is received over the channel at the hardware logic block indicating that the first bank 590 has completed the execution of the first write command 596. In some implementations, the completion signal 587 is received in response to a request for a status response by the hardware logic block. In some implementations, the request for a status response by the hardware logic block is a check of a timer set for a particular command execution time and a check of an associated ready/busy signal for the device. The first bank 590 is no longer busy and new commands can be transmitted to the first bank 590.

The hardware logic block next determines based on the status of the banks, the status of the queues, and current rules regarding the priority ordering of commands, that the next bank to be scheduled to is the second bank 592. The bank scheduler determines that the next command to be transmitted to the second bank 592 is a second read command 589. The second read command 589 is transmitted over the channel to the second bank 592. As shown, the second read command 589 does not overlap with any other transmitted commands or completion signals. Finally, after the second read command 589 has been transmitted, a second completion signal 579 is received over the channel at the command scheduler indicating that the third bank 594 has completed the execution of the second write command 599.

Though FIG. 5 shows an example in which read and write commands are transmitted to banks over the channel, any NAND command may be transmitted over the channel. Additionally, the hardware logic block may determine a scheduling order for more than three banks of NAND die, for example, a hardware logic block on a command scheduler may schedule the command order over a channel for eight or sixteen banks of NAND devices.

Employing a hardware-based logic block to determine the optimal order for commands to be distributed enables the command scheduler to schedule the commands for transmission to a larger number of banks. The hardware-based logic uses logic gates and direct hardware inputs and signals to make a determination of a next bank for which to schedule a command to be transmitted over a channel more quickly than a software-based system. A software-based system for selecting a bank scheduling order becomes unwieldy and performance suffers when it is expanded to include a large number of banks, such as eight or 16 banks, each having multiple hardware signals which influence the determination of whether and when a command may be transmitted to the bank.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A memory system comprising:
    a memory controller having a bank command scheduler implemented in a hardware logic block, the hardware logic block including a plurality of direct inputs; and
    a channel connecting the memory controller to one or more memory banks;
    wherein the hardware logic block is configured to:
        determine, based on the plurality of direct inputs, a command order in which to output a plurality of commands over the channel to one or more memory banks;
        output a first command of the plurality of commands over the channel based on the determined command order;
        estimate a time remaining in execution of the first command, wherein the estimated time remaining is one input of the plurality of direct inputs;
        select a second command of the plurality of commands based on the estimated time remaining of the first command; and
        output the second command over the channel based on the selection.

2. The memory system of claim 1, wherein the bank command scheduler includes a first queue of commands and a second queue of commands to be distributed to a first memory bank of the one or more memory banks.

3. The memory system of claim 2, wherein the first queue of commands comprises high priority commands and the second queue of commands comprises normal priority commands.

4. The memory system of claim 1, wherein the hardware logic block includes an external input of a first rule for determining the command order in which to output the plurality of commands to the one or more memory banks.

5. The memory system of claim 4, wherein the first command is output over the channel to a first memory bank of the one or more memory banks.

6. The memory system of claim 5, wherein the second command is output over the channel to a second memory bank of the one or more memory banks.

7. The memory system of claim 6, wherein when the hardware logic block is unable to determine a command order in which to output commands to the first memory bank and the second memory bank over the channel based on the plurality of direct inputs and the external input of a first rule, a new external input of a second rule is assigned.

8. The memory system of claim 6, wherein the plurality of direct inputs includes information related to the one or more memory banks, and wherein the plurality of direct inputs related to the first memory bank and the second memory bank includes the estimated time remaining of the first command as a first timer status and an estimated time remaining of the second command as a second timer status.

9. The memory system of claim 8, wherein the hardware logic of the bank command scheduler determines, based on the first timer status associated with the first command output to the first memory bank, whether an additional command configured to be sent over the channel to the second memory bank during the estimated time remaining of the first command.

10. The memory system of claim 9, wherein the bank command scheduler transmits a read command to the second memory bank over the channel during the estimated time remaining of the first command based on the selection of the hardware logic.

11. The memory system of claim 10, wherein the bank command scheduler receives a command completion status transmitted by the first memory bank in response to a request for a command completion status.

12. The memory system of claim 11, wherein the hardware logic block is further configured to select a third command of the plurality of commands to be transmitted to a third memory bank of the one or more memory banks during an overlap of the estimated time remaining of the first command and the estimated time remaining of the second command.

13. The memory system of claim 1, wherein the plurality of direct inputs includes at least one of commands queued to be executed in each of the one or more memory banks, commands currently being executed in each of the one or more memory banks, and a status of the one or more memory banks.

14. The memory system of claim 1, wherein each of the one or more memory banks comprises a NAND device.

15. A method of scheduling a distribution of commands to one or more memory banks, the method comprising:
   determining, by a hardware logic block, a command order in which to send a plurality of commands over a channel the one or more memory banks;
   transmitting, based on the command order, a first command of the plurality of commands to a first bank of the one or more memory banks over the channel;
   estimating from a plurality of direct hardware inputs of the hardware logic block a time remaining in execution of the first command;
   selecting, by the hardware logic block, a second command of the plurality of commands to send over the channel to a second bank of the one or more memory banks, based on the estimated time remaining of the first command and the command order; and transmitting the second command to the second bank over the channel.

16. The method of claim 15, wherein the determining the command order is based on a first rule from a plurality of rules for determining an order of commands.

17. The method of claim 16, further comprising selecting a second rule from the plurality of rules, and attempting a determination of a new first command when determining the first command from the command order is unsuccessful.

18. The method of claim 17, wherein the plurality of direct hardware inputs includes information related to the first bank and the second bank, and wherein the plurality of direct hardware inputs related to the first bank and the second bank includes the estimated time remaining of the first command and the estimated time remaining of a second command as a timer status of each of the first bank and the second bank, respectively.

19. The method of claim 16, wherein the first command is selected from a first queue or a second queue associated with the first NAND bank.

20. The method of claim 19, wherein the first queue is a priority queue and the second queue is a normal priority queue.

* * * * *